(12) United States Patent
Florence et al.

(10) Patent No.: US 9,971,425 B2
(45) Date of Patent: May 15, 2018

(54) DYNAMIC DEVICE SENSITIVITY CONTROL

(71) Applicant: International Business Machines Corporation, Armonk, NY (US)

(72) Inventors: Christopher R. Florence, Raleigh, NC (US); Jordan T. Moore, Raleigh, NC (US); Walker L. Sherk, Raleigh, NC (US); Pu Yang, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/175,975

(22) Filed: Jun. 7, 2016

(65) Prior Publication Data
US 2017/0351344 A1    Dec. 7, 2017

(51) Int. Cl.
*G06F 3/038* (2013.01)
*G06F 3/0354* (2013.01)
*G06F 3/0346* (2013.01)

(52) U.S. Cl.
CPC ............ *G06F 3/038* (2013.01); *G06F 3/0346* (2013.01); *G06F 3/0354* (2013.01)

(58) Field of Classification Search
CPC ............... G06F 3/03543; G06F 3/0383; G06F 3/03547; G06F 3/033
USPC .................................. 345/156, 157, 159, 163
See application file for complete search history.

(56) References Cited

U.S. PATENT DOCUMENTS

| | | | |
|---|---|---|---|
| 5,191,641 A * | 3/1993 | Yamamoto | G06F 3/038 345/159 |
| 6,307,536 B1 * | 10/2001 | Hada | B62D 6/002 345/157 |
| 7,190,347 B2 * | 3/2007 | Rensberger | G06F 3/0383 345/157 |
| 8,704,765 B1 * | 4/2014 | Murphy | G06F 3/038 345/157 |
| 8,979,658 B1 | 3/2015 | Kulavik | |
| 2003/0214481 A1 | 11/2003 | Xiong | |
| 2004/0119682 A1 | 6/2004 | Levine et al. | |
| 2010/0306710 A1 * | 12/2010 | Poot | G06F 3/04812 715/856 |
| 2012/0242619 A1 | 9/2012 | Reis Barbosa et al. | |
| 2013/0093674 A1 | 4/2013 | Fei et al. | |
| 2013/0241835 A1 | 9/2013 | Lee | |

(Continued)

FOREIGN PATENT DOCUMENTS

| | | |
|---|---|---|
| CN | 101714035 A | 5/2010 |
| EP | 2048572 A1 | 4/2009 |

(Continued)

OTHER PUBLICATIONS

Liu, Erwu, and J. M. Yuan, "Dynamic sensitivity and control analyses of metabolic insulin signalling pathways." Systems Biology, IET 4.1 (2010): 64-81.

(Continued)

*Primary Examiner* — Koosha Sharifi-Tafreshi
(74) *Attorney, Agent, or Firm* — L. Jeffrey Kelly

(57) ABSTRACT

A method, a computer program product, and an information handling system is provided for controlling a device sensitivity based on a change of movement of the device. A device movement with a device sensitivity controlled by a user movement is monitored for a change in rate of movement or direction. The sensitivity of the device is controlled based on the change.

17 Claims, 4 Drawing Sheets

(56) References Cited

U.S. PATENT DOCUMENTS

2014/0198040 A1* 7/2014 Nicholson ............. G06F 3/0416
345/157
2016/0334884 A1 11/2016 Solomon et al.

FOREIGN PATENT DOCUMENTS

| WO | WO 2005073836 A2 | 8/2005 | | |
|----|------------------|--------|---|---|
| WO | WO 2007124614 A1 | 8/2007 | | |
| WO | WO 2007124614 A1 * | 11/2007 | ............. | G06F 3/038 |
| WO | 2013040903 A1 | 3/2013 | | |
| WO | WO 2015048671 A1 | 4/2015 | | |

OTHER PUBLICATIONS

IBM: List of IBM Patents or Patent Applications Treated as Related (Appendix P), Dated Aug. 17, 2017, 2 pages.
Pending U.S. Appl. No. 15/667,691, filed Aug. 3, 2017, entitled: "Dynamic Device Sensitivity Control", 17 pages.

* cited by examiner

DYNAMIC DEVICE SENSITIVITY CONTROL

BACKGROUND

The present invention relates to a computing environment, and more specifically to a computer program, method, and system for controlling a device sensitivity based on a detected change of movement.

SUMMARY

According to one embodiment of the invention, there is provided a method for controlling a device sensitivity based on a change of movement, the method implemented by a processor, having the steps of monitoring a device movement with a device sensitivity controlled by a user movement. The method receives a first controlling motion of the user controlling a first directional rate of movement of the device and a second controlling motion of the user controlling a second directional rate of movement of the device. The method compares the second directional rate of movement of the device to the first directional rate of movement of the device to determine a device movement change; and controls the device sensitivity based on the device movement change.

According to one embodiment of the invention, there is provided a computing program product executing instructions having the steps of the method of adjusting the device movement sensitivity.

According to one embodiment of the invention, there is provided an information handling system including at least one processor executing instructions implementing steps of the method of adjusting the device movement sensitivity.

BRIEF DESCRIPTION OF THE DRAWINGS

The above-mentioned features of the present invention may be better understood, and its numerous objects, features, and advantages made apparent to those skilled in the art by taken in conjunction with the accompanying drawings wherein like reference numerals denote like elements and in which.

DETAILED DESCRIPTION

Embodiments of the invention are described below with reference to drawings in detail.

Figure 1:
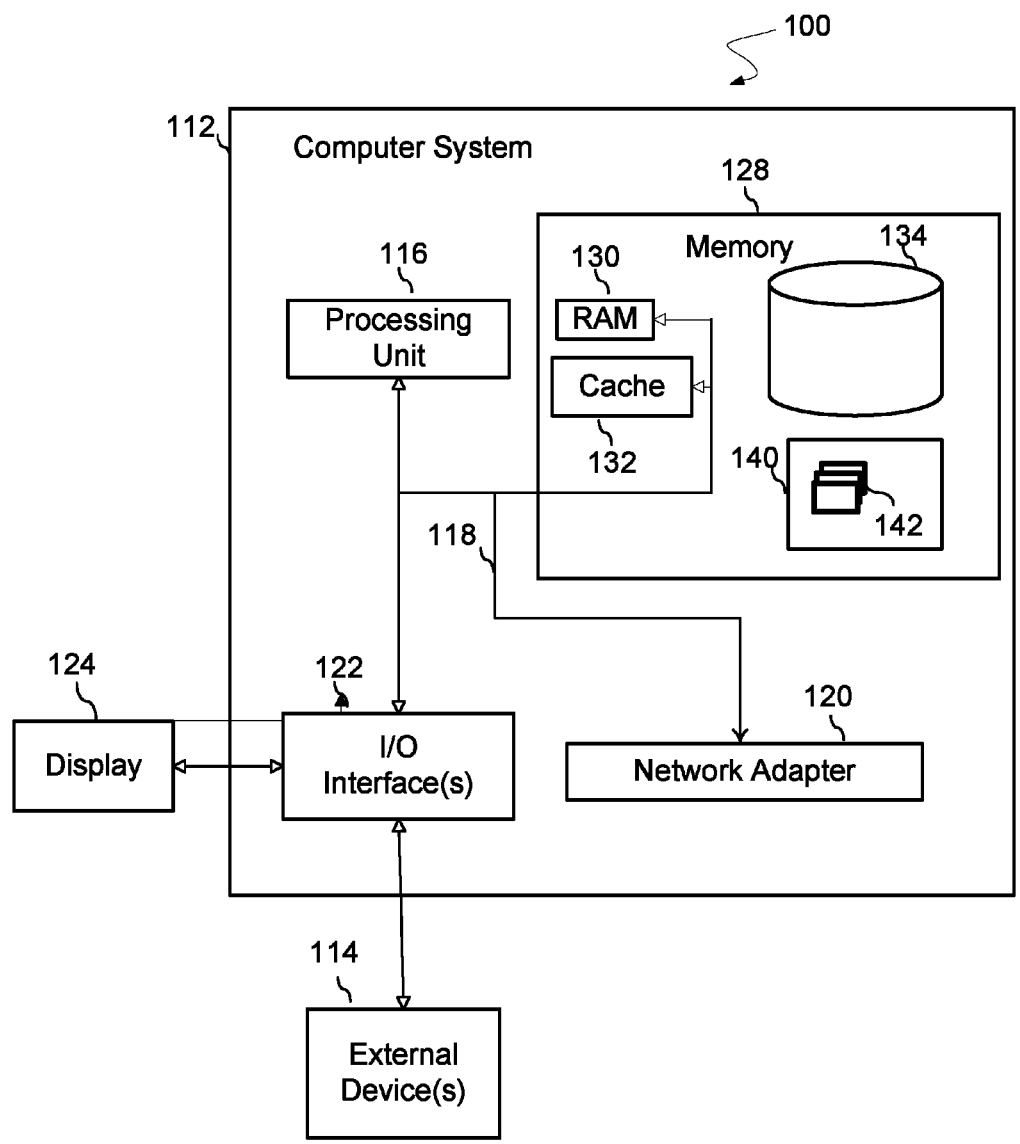
FIG. 1 depicts a computer system 100 according to an embodiment of the present invention and is a block diagram example of a data processing system in which the methods described herein can be implemented.

Referring to FIG. 1, a schematic of a processing system 100 is shown wherein the methods of this invention may be implemented. The processing system 100 is only one example of a suitable system and is not intended to suggest any limitation as to the scope of use or functionality of embodiments of the invention described herein. Regardless, the system 100 is capable of implementing and/or performing any of the functionality set forth herein. In the system 100 there is a computer system 112, which is operational with numerous other general purpose or special purpose computing system environments or configurations. Examples of well-known computing systems, environments, and/or configurations that may be suitable for use with the computer system 112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 112 may be described in the general context of computer system-executable instructions, such as program modules, being executed by a computer system. Generally, program modules may include routines, programs, objects, components, logic, data structures, and so on that perform particular tasks or implement particular abstract data types. The computer system 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 112 in the system environment 100 is shown in the form of a general-purpose computing device. The components of the computer system 112 may include, but are not limited to, a set of one or more processors or processing units 116, a system memory 128, and a bus 118 that couples various system components including the system memory 128 to the processor 116.

The bus 118 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA) bus, the Micro Channel Architecture (MCA) bus, the Enhanced ISA (EISA) bus, the Video Electronics Standards Association (VESA) local bus, and the Peripheral Component Interconnects (PCI) bus.

The computer system 112 typically includes a variety of computer system readable media. Such media may be any available media that is accessible by the computer system 112, and it includes both volatile and non-volatile media, removable and non-removable media.

The system memory 128 can include computer system readable media in the form of volatile memory, such as random access memory (RAM) 130 and/or a cache memory 132. The computer system 112 may further include other removable/non-removable, volatile/non-volatile computer system storage media. By way of example only, a storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 118 by one or more data media interfaces. As will be further depicted and described below, the system memory 128 may include at least one program product having a set (e.g., at least one) of program modules 142 that are configured to carry out the functions of embodiments of the invention.

A program/utility 140, having the set (at least one) of program modules 142, may be stored in the system memory 128 by way of example, and not limitation, as well as an operating system, one or more application programs, other program modules, and program data. Each of the operating systems may have one or more application programs, other program modules, and program data or some combination thereof, and may include an implementation of a networking environment. The program modules 142 generally carry out the functions and/or methodologies of embodiments of the invention as described herein.

The computer system 112 may also communicate with a set of one or more external devices 114 such as a keyboard, a pointing device, a display 124, a tablet, a digital pen, etc. wherein these one or more devices enable a user to interact with the computer system 112; and/or any devices (e.g., network card, modem, etc.) that enable the computer system 112 to communicate with one or more other computing devices. Such communication can occur via Input/Output (I/O) interfaces 122. These include wireless devices and other devices that may be connected to the computer system 112, such as, a USB port, which may be used by a tablet device (not shown). Still yet, the computer system 112 can communicate with one or more networks such as a local area network (LAN), a general wide area network (WAN), and/or a public network (e.g., the Internet) via a network adapter 120. As depicted, a network adapter 120 communicates with the other components of the computer system 112 via the bus 118. It should be understood that although not shown, other hardware and/or software components could be used in conjunction with the computer system 112. Examples include, but are not limited to: microcode, device drivers, redundant processing units, external disk drive arrays, RAID systems, tape drives, and data archival storage systems, etc.

Figure 2:
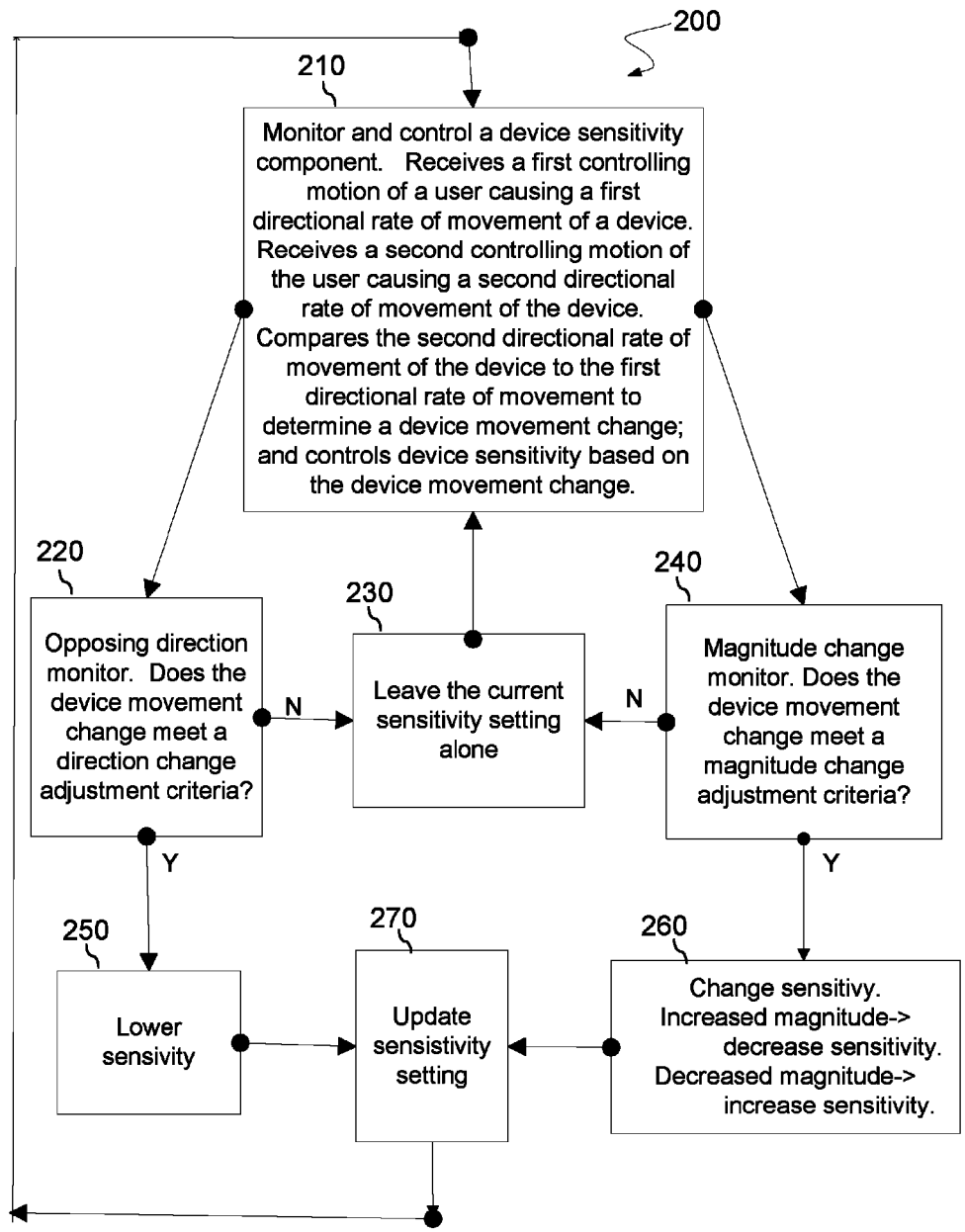
FIG. 2 depicts a functional set of components and a flow of control for monitoring user initiated movements of a device and controlling sensitivity of the device based on detecting changes.

FIG. 2 depicts a functional set of components and a flow of control for monitoring user initiated movements of a device and controlling sensitivity of the device based on detecting changes. Monitor and control a device sensitivity component 210 may be implemented in a computer system 112 including I/O interface(s) 122 that capture user control and devices metrics. The metrics captured may reflect movement against a surface, a rotation, a change of position or any other user initiated movement controlling a device. The operating system typically provides an infrastructure to capture the movement and interfaces to allow the movement to be processed by an application. The application may have menu items allowing a user to select entries on a graphical user interface (GUI) or may allow a user to control and adjust images or icons represented on a screen or in a physical system. Examples include, but are not limited to: image manipulation, drawings, charts, avatars, character movement such as in a game console, and a mechanical device controlling a device at a distance. The feedback of the movement may be presented as a visual feedback by showing updates on screen or even on virtual 3D glasses. In some example embodiments, the updates may be contained within the computer system 112 and visual feedback may be determined by an application running on the computer system 112 and shown on display 124. In other example embodiments, an application running on the computer system 112 may be utilizing I/O interfaces 122 to interface with an external device 114 to remotely control or operate the external device 114. The external device 114 could be small and control, for example, a laparoscopic surgery or large and, for example, control an arm of a grasping device on a space shuttle. Feedback to the user from the external device 114 may be via an image captured by a camera. The metrics are received by the monitor and control a device sensitivity component 210 which receives a first controlling motion of a user causing a first directional rate of movement of a device. The process receives a second controlling motion of the user causing a second directional rate of movement of the device. The process compares the second directional rate of movement of the device to the directional rate of movement to determine a device movement change and controls the device sensitivity based on the device movement change. The monitor and control a device sensitivity component 210 may support application programming interfaces (APIs) allowing applications to communicate application states to the monitor and control a device sensitivity component 210.

An aspect of the invention is described in an example scenario. The user movement metrics that control the device movement are processed by the system. The system interprets the user movements as device movements and maps the user movements to device metrics. During the conversion of the user movement to device movement, the monitor and control a device sensitivity component 210 may change the interpretation of the user movement to device movement to control the sensitivity of the device to the user movements. The device metrics, or device input data, may be converted and represented in memory structures as directional vectors.

In the example scenario, the system compares the directional vectors periodically by opposing direction monitor 220 which calculates a change of vector rate and compares the change of vector rate to a change of direction adjustment criteria. If the change of direction rate meets a change of direction adjustment criteria, the flow of control proceeds to lower sensitivity 250 which updates the sensitivity setting 270 and the flow returns to control device input 210. In an embodiment, the change of direction adjustment criteria reflects missing a target and a backward or corrective movement. By lowering the device sensitivity 250 more movement is required by the user to cause the device to move at the same rate with the previous sensitivity. If the change of direction rate does not meet the direction change adjustment criteria, the flow of control proceeds to leave the current sensitivity setting alone 230 and the flow returns to monitor and control device sensitivity component 210.

Another aspect for monitoring and control device sensitivity component 210 is to analyze the device movement data by magnitude change monitor 240. The magnitude change monitor 240 checks for changes in the amount of movement of the device in a manner similar to the opposing direction monitor 220. The amount of movement change may be determined by calculating a magnitude difference between the second vector and the first vector. The magnitude difference is compared to a change of magnitude adjustment criteria. If the magnitude difference meets the magnitude adjustment criteria, the flow proceeds to change the sensitivity 260 transferring control to update sensitivity setting 270 and the flow proceeds to monitor and control sensitivity setting 210. If the change of magnitude is increased, then the user is trying to move the device faster and the process increases the device sensitivity. Increasing the sensitivity requires less user movement to cause the device to move at the same rate with the previous sensitivity. If the change of magnitude is decreased then the user is trying to move the device slower and the process decreases the device sensitivity. The adjustment that decreases the sensitivity allows for more user movement to move the device less. This may be considered a finer granularity of control. The components may be separated or be combined, for example, in the device support, in the operating system, or in the application process 142 making calls to other components. All the process steps in FIG. 2 may be performed by the monitoring and control device sensitivity component 210.

Figure 3:
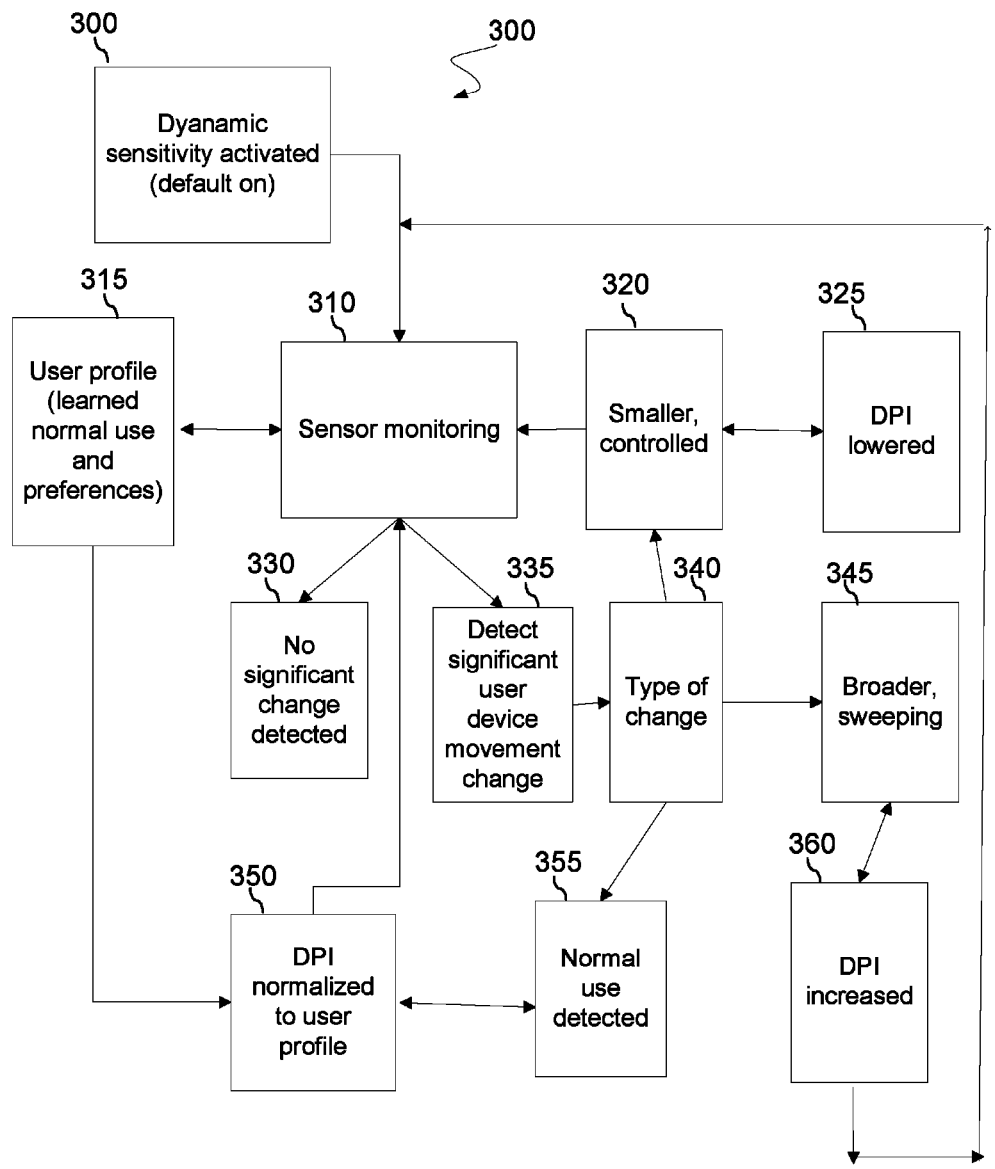
FIG. 3 depicts an example embodiment of the invention herein.

FIG. 3 depicts a more detailed flow of an example embodiment depicting an aspect of the invention described herein. In the example embodiment, the device is a mouse and the user moves the mouse against a surface. The default for dynamic sensitivity activated 300 is on and the flow proceeds to sensor monitoring 310. The sensor monitoring 310 corresponds to monitor and control a device sensitivity component 210 which monitors user initiated device movement changes. If no significant changes from normal usage are detected the process proceeds to no significant change detected 330 and no further action is taken. If significant changes are detected, the process proceeds to detect significant user device movement change 335 and continues to determine a type of change 340. There are three types of changes that may be detected.

A first type of change is a normal use detected 355 which corresponds to step 230. From step 355, the process proceeds to normalize the dots per inch (DPI) to the user profile 315. In this case, the user has performed an operation that is consistent with a user profile (learned normal use and preferences) 315. Various approaches may be used to create the user profile 315. One approach may be to start from statistical information gathered from many users related to the device. The information could range from generic usage to application specific with details related to application operations. Another approach may be to capture a history specific to the user and utilize a user interface allowing the user to indicate preferences. Again the preferences could range from generic usage to application specific with details related to application operations or even specific menu items or application states. The system may support defaults for new applications, for example, by the type of new application.

At step 340, a second type of change, a smaller, controlled 320 condition may be detected and the DPI is lowered 325. This corresponds to steps 220, 250, and 270. The conditions for the DPI is lowered 325 operation is received by sensor monitoring 310 and communicated to user profile 315 which contributes to establishing a history of usage. At step 340, a third type of change, a broader, sweeping 335 condition may be detected and the DPI is increase 325. This corresponds to steps 240, 260, and 270. The conditions for the DPI is increased 360 operation is received by sensor monitoring 310 and communicated to user profile 315 which contributes to establishing the history of usage.

Figure 4:
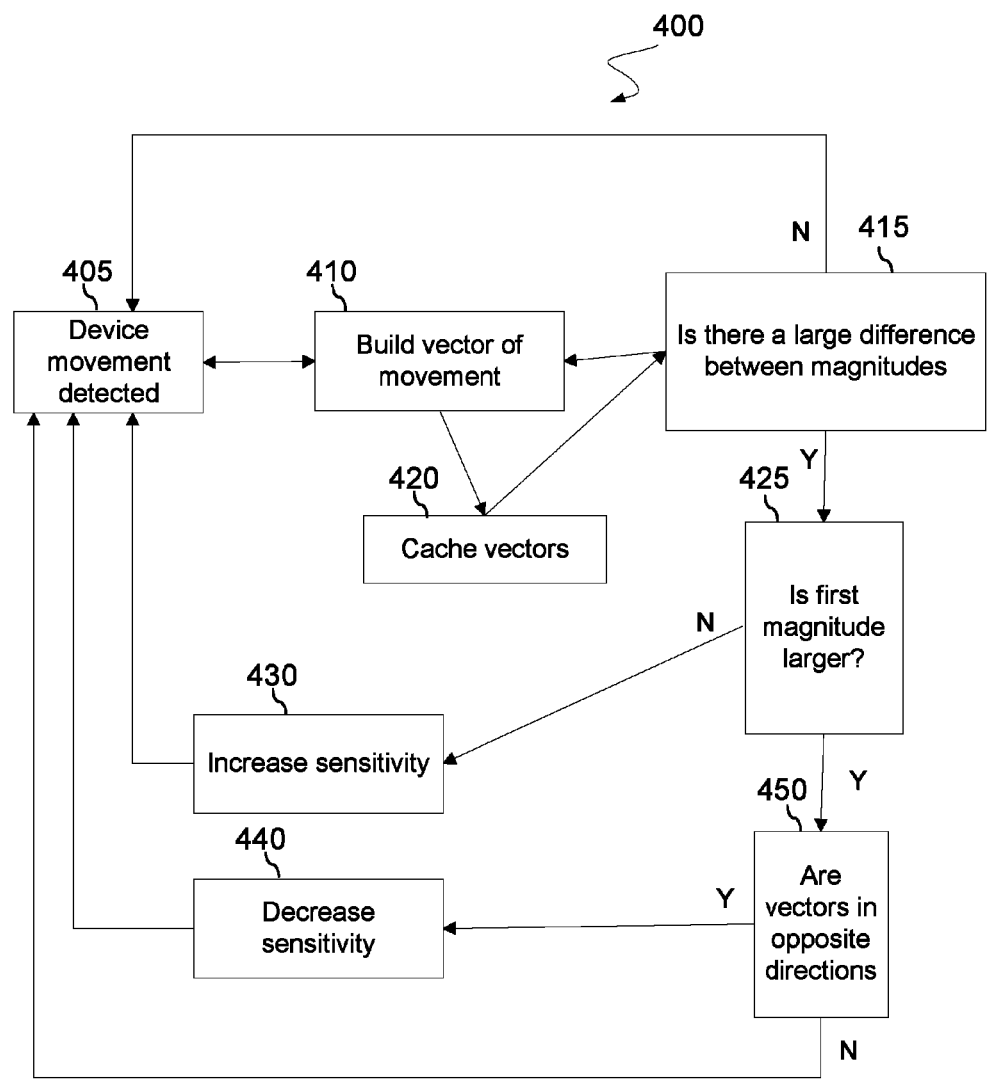
FIG. 4 depicts more details for an example embodiment of the invention herein.

FIG. 4 depicts more details of an example implementation of monitor and control a device sensitivity component 210 and sensor monitoring 310. An aspect of the invention is described in an example scenario. Often, a computer system 112 supports I/O interface(s) 122 where user control of a devices metrics are captured or input into applications processes 142. The device metrics may be represented in memory structures. In this example embodiment, the process begins with sensor monitoring 310. In the example embodiment, device movement detected 405 receives information about the device input. The information is captured and stored as structured data. The structured data may be a set of data, for example, coordinates and time. For illustration purposes only, each entry is referenced as a row in a table, where the E1M1 is the first entry in row 1 for M1, E1M2 is the 2nd entry in row 1 for M2, . . . , continuing to E1Mn being the nth entry in row 1 for the metric Mn. Similarly, E2M1 is the first entry in the row 2 for M1, E2M2 is the 2nd entry in row 2 for M2, . . . , and E2Mn which is the nth entry in row 2 for Mn. This continues for all the input data, where EkM1 is the first entry in row k for M1, EkM2, is the second entry in row k for M2, . . . , continuing to EkMn which is the nth entry in row k for Mn. The metrics may be a 3D co-ordinate and time. In that case, each row would be a 3D co-ordinate (X, Y, and Z) and a time or a time ordered data. The entries may reflect changes or deltas instead of absolute co-ordinates. In any case, the input data may be converted into directional vectors to build a vector of movement 410 and store the information in cache vectors 420. The vector of movement 410 may represent a duration of time where the first directional vector and the second directional vector are for the duration of time. The process proceeds to step 415 where vector operations may be used to determine magnitudes of vectors and answer the question: Is there a large difference between magnitudes 415. If there is not a large magnitude difference, the process continues to detect movement 405. If there is a large magnitude difference between the magnitudes 415, the process continues to step 425 to answer the question: Is the first magnitude larger 425? If the answer to the first magnitude larger 425 question is no, then the previous vector was smaller than the current vector and the process proceeds to increase sensitivity 430 and the process proceeds to detect movement 405. If the answer to the first magnitude larger 425 questions is yes, then the process continues to answer the question: Are vectors in opposite directions 450? If the answer to are the vectors in opposite directions 450 is yes, then the user has made a corrective action and the processes proceeds to decreases sensitivity 440 and then the process proceeds to detect movement 405. If the answer to are the vectors in opposite directions 450 is no, then no corrective actions is made and the process proceeds to detect movement 405. Adjustments to the flow would be affected by user profile 315.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for controlling a device sensitivity based on a change of movement, the method implemented by a processor, comprising:
   receiving a first controlling motion from a user operating a device, wherein the first controlling motion causes a first directional rate of movement in the device, the first directional rate of movement of the device comprises a first directional vector;
   receiving a second controlling motion from the user, wherein the second controlling motion causes a second directional rate of movement in the device, the second directional rate of movement of the device comprises a second directional vector,
   wherein the device is monitored using a plurality of device metrics comprising movement against a surface, a rotation, a change of position or any other user-initiated movement of the device, the plurality of device metrics are represented in memory structures as directional vectors and stored as structure data comprising a collection of three-dimensional coordinates and time, such that each controlling motion performed by the user is interpreted as a device movement and mapped to at least one device metric,
   wherein each of the first directional vector and the second directional vector is associated with a duration of time of the first controlling motion and the second controlling motion, respectively;
   comparing the second directional rate of movement of the device to the first directional rate of movement of the device to determine a change of direction, wherein determining the change of direction is based on a predetermined direction adjustment criteria associated with a historic collection of interactions between the user and the device, wherein the direction adjustment criteria comprises missing a target and a backward or corrective movement, and the historic collection of interactions is based on a user profile determined according to a normal usage of the device comprising learned normal use and user preferences, a gathering of statistical information from one or more users of the device, a history specific to the user, or preferences indicated by the user by means of a user interface;

based on the determined change of direction comprising a smaller and controlled condition, lowering dots per inch of the device; and based on the determined change of direction comprising a broader and sweeping condition, increasing dots per inch of the device.

2. The method of claim 1, wherein the determined change of direction comprises an opposing direction and the device sensitivity is lowered.

3. The method of claim 1, wherein the predefined direction adjustment criteria comprises a predetermined change of direction, and the opposing direction is within the predetermined change of direction.

4. The method of claim 1, further comprising:
comparing the second directional rate of movement of the device to the first directional rate of movement of the device to determine an amount of movement by calculating a magnitude difference between the second directional rate of movement and the first directional rate of movement;
comparing the determined amount of movement to a predefined magnitude adjustment criteria; and
adjusting a sensitivity of the device based on the comparison of the determined amount of movement to the predefined movement adjustment criteria.

5. The method of claim 4, wherein the determined amount of movement comprises an increase in magnitude and the device sensitivity is lowered.

6. The method of claim 4, wherein the determined amount of movement comprises a decrease in magnitude and the device sensitivity is increased.

7. A computer program product for dynamically adjusting control sensitivity based on a change of movement, the computer program product comprising a computer readable storage medium having program instructions embodied therewith, the program instructions executable on a processing circuit to cause the processing circuit to perform the method comprising:
receiving a first controlling motion from a user operating a device, wherein the first controlling motion causes a first directional rate of movement in the device, the first directional rate of movement of the device comprises a first directional vector;
receiving a second controlling motion from the user, wherein the second controlling motion causes a second directional rate of movement in the device, the second directional rate of movement of the device comprises a second directional vector,
wherein the device is monitored using a plurality of device metrics comprising movement against a surface, a rotation, a change of position or any other user-initiated movement of the device, the plurality of device metrics are represented in memory structures as directional vectors and stored as structure data comprising a collection of three-dimensional coordinates and time, such that each controlling motion performed by the user is interpreted as a device movement and mapped to at least one device metric,
wherein each of the first directional vector and the second directional vector is associated with a duration of time of the first controlling motion and the second controlling motion, respectively;
comparing the second directional rate of movement of the device to the first directional rate of movement of the device to determine a change of direction, wherein determining the change of direction is based on a predetermined direction adjustment criteria associated with a historic collection of interactions between the user and the device, wherein the direction adjustment criteria comprises missing a target and a backward or corrective movement, and the historic collection of interactions is based on a user profile determined according to a normal usage of the device comprising learned normal use and user preferences, a gathering of statistical information from one or more users of the device, a history specific to the user, or preferences indicated by the user by means of a user interface;

based on the determined change of direction comprising a smaller and controlled condition, lowering dots per inch of the device; and based on the determined change of direction comprising a broader and sweeping condition, increasing dots per inch of the device.

8. The computer program product of claim 7, wherein the determined change of direction comprises an opposing direction and the device sensitivity is lowered.

9. The computer program product of claim 7, wherein the predefined direction adjustment criteria comprises a predetermined change of direction, and the opposing direction is within the predetermined change of direction.

10. The computer program product of claim 7, further comprising:
comparing the second directional rate of movement of the device to the first directional rate of movement of the device to determine an amount of movement by calculating a magnitude difference between the second directional rate of movement and the first directional rate of movement;
comparing the determined amount of movement to a predefined magnitude adjustment criteria; and
adjusting a sensitivity of the device based on the comparison of the determined amount of movement to the predefined movement adjustment criteria.

11. The computer program product of claim 10, wherein the determined amount of movement comprises an increase in magnitude and the device sensitivity is lowered.

12. The computer program product of claim 10, wherein the determined amount of movement comprises a decrease in magnitude and the device sensitivity is increased.

13. An information handling system for dynamically adjusting control sensitivity based on a change of movement, the information handling system comprising:
at least one processor;
a memory coupled to the at least one processor;
a set of instructions stored in the memory and executed by the at least one processor wherein the set of instructions perform operations including:
receiving a first controlling motion from a user operating a device, wherein the first controlling motion causes a first directional rate of movement in the device, the first directional rate of movement of the device comprises a first directional vector;
receiving a second controlling motion from the user, wherein the second controlling motion causes a second directional rate of movement in the device, the second directional rate of movement of the device comprises a second directional vector, wherein the device is monitored using a plurality of device metrics comprising movement against a surface, a rotation, a change of position or any other user-initiated movement of the device, the plurality of device metrics are represented in memory structures as directional vectors and stored as structure data comprising a collection of three-dimensional coordinates and time, such that each controlling motion performed by the user is interpreted as a device movement and mapped to at least one device metric, wherein each of the first directional vector and the second directional vector is associated with a duration of time of the first controlling motion and the second controlling motion, respectively;

comparing the second directional rate of movement of the device to the first directional rate of movement of the device to determine a change of direction, wherein determining the change of direction is based on a predetermined direction adjustment criteria associated with a historic collection of interactions between the user and the device, wherein the direction adjustment criteria comprises missing a target and a backward or corrective movement, and the historic collection of interactions is based on a user profile determined according to a normal usage of the device comprising learned normal use and user preferences, a gathering of statistical information from one or more users of the device, a history specific to the user, or preferences indicated by the user by means of a user interface;

based on the determined change of direction comprising a smaller and controlled condition, lowering dots per inch of the device; and based on the determined change of direction comprising a broader and sweeping condition, increasing dots per inch of the device.

14. The information handling system of claim 13, wherein the determined change of direction comprises an opposing direction and the device sensitivity is lowered.

15. The information handling system of claim 13, wherein the predefined direction adjustment criteria comprises a predetermined change of direction, and the opposing direction is within the predetermined change of direction.

16. The information handling system of claim 13, further comprising:

comparing the second directional rate of movement of the device to the first directional rate of movement of the device to determine an amount of movement by calculating a magnitude difference between the second directional rate of movement and the first directional rate of movement;

comparing the determined amount of movement to a predefined magnitude adjustment criteria; and adjusting a sensitivity of the device based on the comparison of the determined amount of movement to the predefined movement adjustment criteria.

17. The information handling system of claim 16, wherein the determined amount of movement comprises a decrease in magnitude and the device sensitivity is increased, and wherein the determined amount of movement comprises a decrease in magnitude and the device sensitivity is increased.

* * * * *